United States Patent [19]
Wiley, Jr.

[11] 4,087,124
[45] May 2, 1978

[54] ILLUMINATED DRAG REDUCING SYSTEM

[75] Inventor: Nathaniel C. Wiley, Jr., Weston, Conn.

[73] Assignee: Rudkin-Wiley Corporation, Stratford, Conn.

[21] Appl. No.: 655,874

[22] Filed: Feb. 6, 1976

Related U.S. Application Data

[63] Continuation of Ser. No. 490,249, Jul. 22, 1974, abandoned.

[51] Int. Cl.² .......................................... B62D 35/00
[52] U.S. Cl. .................................. 296/1 S; 40/592; 105/2 R; 224/42.1 E
[58] Field of Search ........................ 296/1 S, 91; 224/42.1 E, 42.1 B, 42.1 F, 42.1 R; 105/2 R, 2 A; 40/129 C, 132 R, 204, 205, 133 R, 133 B, 125, 132 D

[56] References Cited

U.S. PATENT DOCUMENTS

| | | | |
|---|---|---|---|
| 2,345,998 | 4/1944 | Apuzzo | 40/132 R |
| 2,652,650 | 9/1953 | Helms | 40/129 C |
| 3,309,131 | 3/1967 | Saunders | 296/15 |
| 3,318,031 | 5/1967 | Whaley | 40/129 |
| 3,596,974 | 8/1971 | Adams | 296/1 S |
| 3,802,103 | 4/1974 | Neff | 40/129 C |

*Primary Examiner*—Joseph F. Peters, Jr.
*Assistant Examiner*—John A. Carroll
*Attorney, Agent, or Firm*—Mattern, Ware, Davis and Stoltz

[57] ABSTRACT

By providing a wind deflecting panel with illuminating devices mounted thereto and an information bearing overlay positioned in spaced juxtaposition to said illuminating devices, an illuminated drag reducer is provided. In this manner, advertising messages or warnings can be provided on the overlay for both daytime and nighttime visibility.

16 Claims, 6 Drawing Figures

ILLUMINATED DRAG REDUCING SYSTEM

This is a continuation of application Ser. No. 490,249 filed July 22, 1974, and now abandoned.

SUMMARY OF THE INVENTION

This invention relates to back lighted illuminated drag reducing systems and more particularly to back lighted, refracted, illuminated drag reducers.

The construction and the advantages provided by employing drag reducers, such as wind deflectors, are well-known in the art and are fully described in Walter S. Saunders U.S. Pat Nos. 3,241,876; 3,309,131; and 3,348,873. Also, the construction and mounting of an illuminated sign housing on the rear panel and front panel of a trailer is disclosed in U.S. Pat. No. 3,802,103.

Presently, wind deflector-drag reducers are primarily employed for the fuel saving attributes that they provide. In some instances, advertisements are lettered on the wind deflectors in order to provide daytime advertising of various products or truck lines. However, nighttime advertising has only been possible on these prior art wind deflectors by using front lighting.

Therefore, it is a principal object of this invention to provide an illuminated drag reducing system which will provide all of the fuel saving attributes of prior art drag reducers while also providing both day and nighttime advertising space.

Another object of this invention is to provide an illuminated drag reducing system of the above character which can be quickly and easily installed and connected to the illuminating power source.

Another object of this invention is to provide an illuminated drag reducing system of the above character which is back lighted, using refractive light to provide the illumination, thereby eliminating undesirable reflective, front lighting.

A further object of this invention is to provide an illuminated wind deflector of the above character which is completely self-contained and moisture proof.

Another object of this invention is to provide an illuminated drag reducing system of the above character which can be easily manufactured from existing wind deflectors.

Other and more specific objects will impart the obvious and will in part appear hereinafter.

In the preferred embodiment, the illuminated drag reducing system of this invention comprises a wind deflecting panel mounted to the cab roof of a truck as is well-known in the art, illuminating means, and an information bearing overlay mounted in space juxtapositioned to said illuminating means for illumination thereof. In this way, advertising slogans, logos, designs, etc., can be placed on the overlay and the overlay positioned in spaced juxtaposition to the illuminating means. Also, warning messages can be placed on the overlay and used to help other drivers by warning them of accidents. As a result, the advertisement or warning is illuminated, providing the desired nighttime visibility.

In one embodiment, a fluorescent light source is mounted in a light housing which is secured or molded to the back of a wind deflecting panel. A desired portion of the wind deflecting panel is cut away or left open in order to provide access to the fluorescent retaining housing. Then, a light diffusing panel is mounted to the existing wind deflecting panel covering the open portion. The desired information is mounted on flexible, transparent sheet material which is then spread over and secured to the light diffusing panel. The fluorescent lights are connected to the existing power source of the truck and, when illuminated, provide the desired illumination of the information-bearing sheet.

In another embodiment, electroluminescent material is mounted directly to a wind deflecting panel with the information on transparent sheet material mounted over the electroluminescent material. The electroluminescent material is connected to the power source of the truck and, when the desired lighting is achieved, the advertisement is illuminated, providing the desired nighttime visibility.

As would be obvious to one skilled in the art, other sources of illumination could be employed, such as incandescent lighting, without departing from the scope of this invention.

The invention accordingly comprises a product possessing the features, properties and relation of components which will be exemplified in the product hereinafter described, and the scope of the invention will be indicated in the claims.

THE DRAWINGS

For a fuller understanding of the nature and objects of the invention, reference should be had to the following detailed description taken in connection with the accompanying drawings, in which.

DETAILED DESCRIPTION

Figure 1:
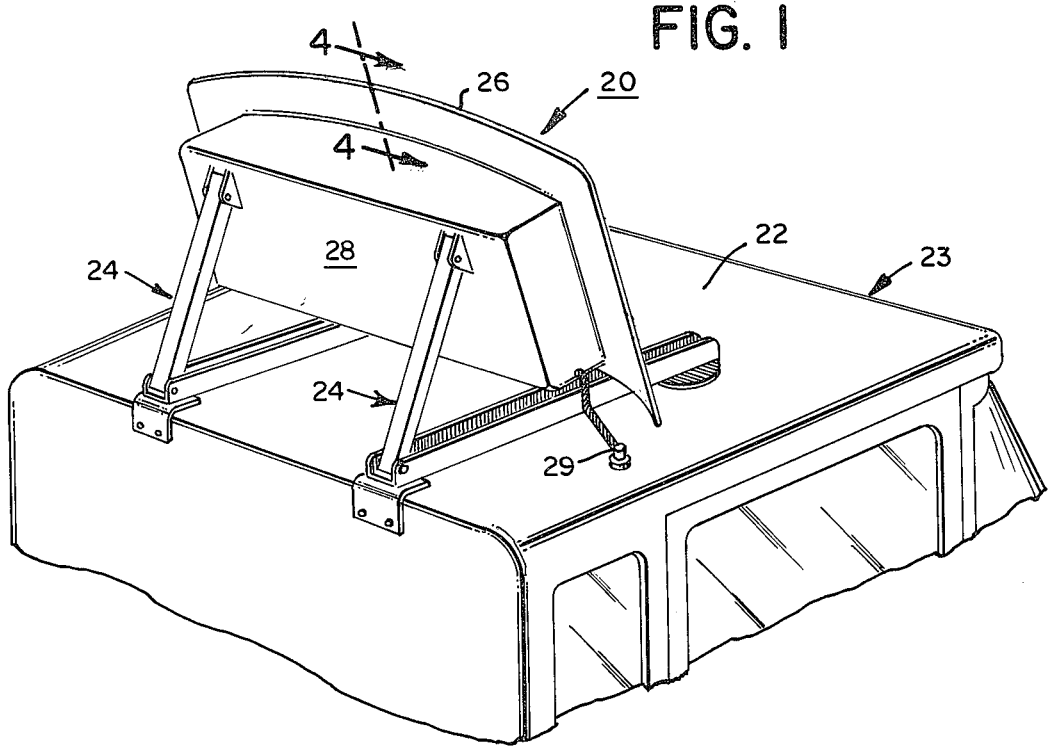
FIG. 1 is a perspective view showing the rear of one embodiment of the illuminated drag reducing system of this invention mounted on a cab roof.

In FIG. 1, one embodiment of the illuminated wind deflector-drag reducing system 20 is shown mounted to cab roof 22 of truck 23 using bracket assembly 24. Illuminated wind deflector system 20 comprises a wind deflecting panel 26 and a housing 28 within which illuminating means are contained. Cable 29 is connected between the illuminating means of housing 28 and the power source of truck 23. As will be more fully described below, when the power is activated, the illuminating means within housing 28 are turned on, causing illumination of an information-bearing sheet.

Figure 2:
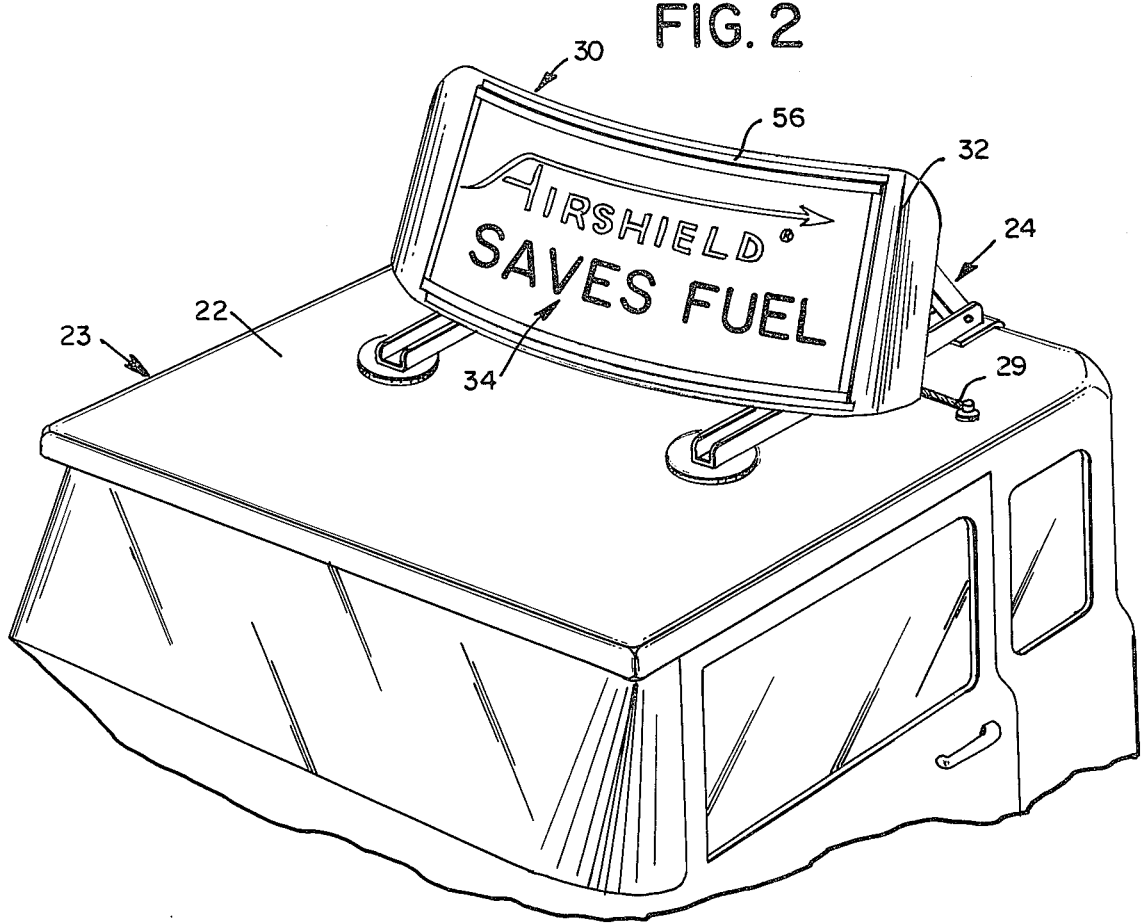
FIG. 2 is a perspective view showing the front of another embodiment of the illuminated drag reducing system of this invention mounted on a cab roof.

In FIG. 2, another embodiment of the illuminated wind deflector-drag reducing system is shown mounted on cab roof 22 of truck 23 by means of bracket assembly 24. In this embodiment, illuminated wind deflector-drag reducing system 30 comprises a wind deflecting panel 32 and an electroluminescent assembly 34 mounted thereto. In this embodiment, the electroluminescent material of electroluminescent assembly 34 is connected through cable 29 to the power source of truck 23. Consequently, when power is provided to the electroluminescent material, an information-bearing overlay positioned in juxtaposed spaced relationship to the electroluminescent material, is illuminated for nighttime visibility.

Figure 3:
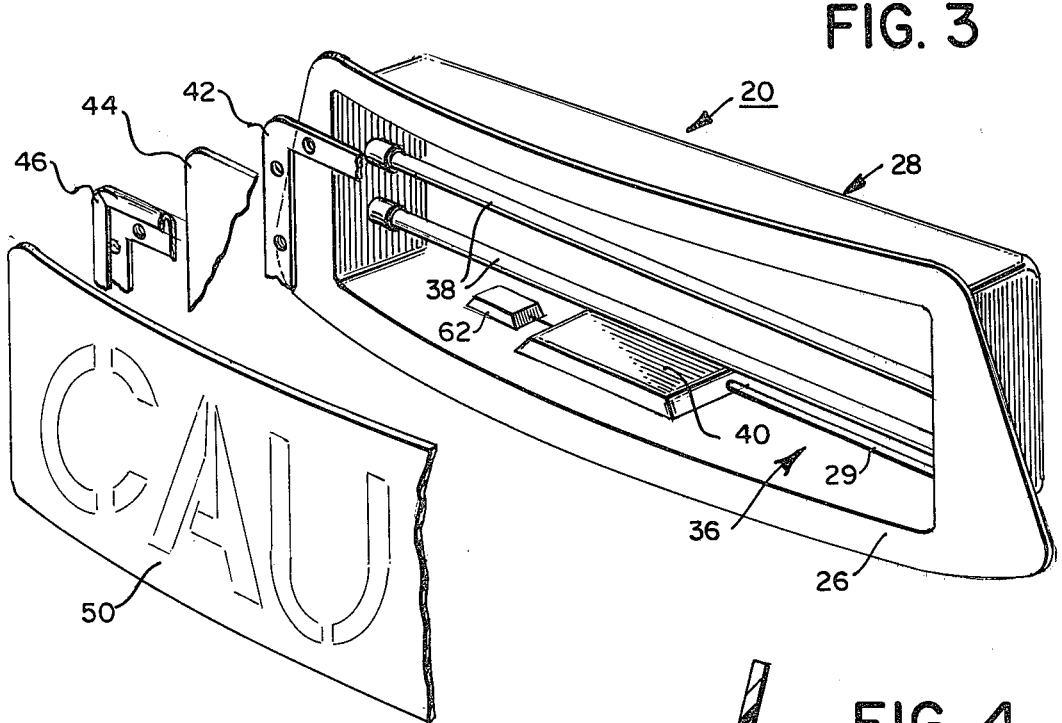
FIG. 3 is an exploded perspective view of the illuminated drag reducing system of FIG. 1.

By referring to FIG. 3, the construction of illuminated wind deflector system 20 can best be understood. In this embodiment, a wind deflecting panel 26 is manufactured with housing 28 molded therein leaving a large open area 36 for access to housing 28. If desired, a standard wind deflector, well-known in the art, can be converted to an illuminated wind deflector system by cutting out the large open space 36 and mounting a housing 28 to the rear of the wind deflector.

As shown in FIG. 3, fluorescent tubes 38 are mounted inside housing 28 and connected to inverter ballast 40. Cable 29 is connected between the low voltage D.C. power source of the truck and inverter ballast 40. Inverter ballast 40 provides the necessary boosting power to illuminate fluorescent lamps 38. As would be obvious to one skilled in the art, any type of illuminating means can be employed. Typically, in this embodiment, fluorescent or incandescent lights are employed. If fluorescent lights are employed either hot or cold cathode lamps can be used. The number of lamps used depends upon the amount of illumination and diffusion desired.

Figure 4:
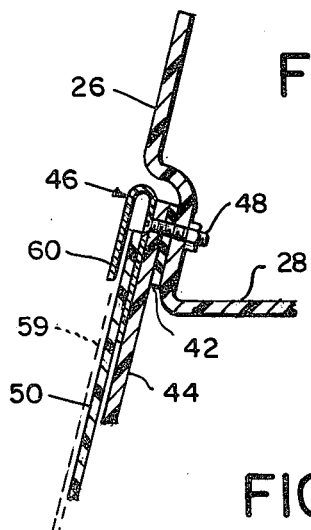
FIG. 4 is a partial cross-sectional side view of the illuminated drag reducing system of FIG. 1 taken along line 4—4 of FIG. 1, showing the assembly of the illuminated drag reducing system in greater detail.

As shown in FIGS. 3 and 4, the illuminated wind deflector system construction is completed by mounting a retaining flange or bezel 46, a defuser panel 44, and a gasket 42 directly to wind deflector panel 26. Gasket 42 is included in order to provide weather-proofing and prevent seepage of moisture into housing 28. Defuser panel 44 can be of any suitable material, which will provide the necessary complete diffusion of illumination of the entire area 36. In the preferred embodiment, defuser panel 44 comprises a transluscent milk-white polycarbonate having a thickness of about one-eighth of an inch. The entire assembly is held together by bolt means 48. If desired, a protective panel 59 can be installed over overlay 50 in order to protect the information sheet.

Bezel 46 comprises a peripherally surrounding flange portion 60 in order to allow the quick and easy insertion and removal of information bearing overlay 50. Overlay 50 in the preferred embodiment comprises a transluscent or transparent flexible material, such as Mylar, having a thickness of between about 0.003 and 0.060 inches. Overlay 50 incorporates the advertising or warning information thereon which can be quickly and easily inserted into peripherally surrounding flange 60 of bezel 46 and held thereby. When desired, overlay 50 can be quickly removed and another overlay replaced within the flanged bezel.

In the preferred embodiment, overlay 50 incorporates the indicia or advertising warning information on the rear side thereof in order to prevent destruction by exposure to the normal weathering elements or other projectiles, such as stones and sticks, which may impinge upon the exposed surface of overlay 50. Transparent flexible overlay 50 can have the indicia or "message" printed thereon in a variety of methods, well-known in the art, such as silk screening, painting, etc., using a variety of transluscent colors if desired. In this way, an extremely attractive and readily identifiable information package can be provided which will be completely illuminated and readily visible during nighttime conditions.

As shown in FIG. 3, the overlay 50 can have a warning message, such as CAUTION, printed thereon for use during emergency situations. If desired, merely a hazard or emergency transluscent color, such as red or orange, can be employed without any letters thereon. In this way, a truck driver can quickly place the warning overlay into the illuminated area and provide a highly nighttime visible warning signal for other drivers in emergency situations. Furthermore, the illuminated drag reducer can be used to help find a truck that may have broken down in a deserted area.

If desired, a light flashing circuit 62 can be incorporated into the drag reducing system, as shown in FIG. 3. Flashing circuit 62 is connected to a switch which the driver can easily engage in emergency conditions. In this way the illumination source flashes on and off in order to attract greater attention and provide an excellent warning for other drivers.

Figure 6:
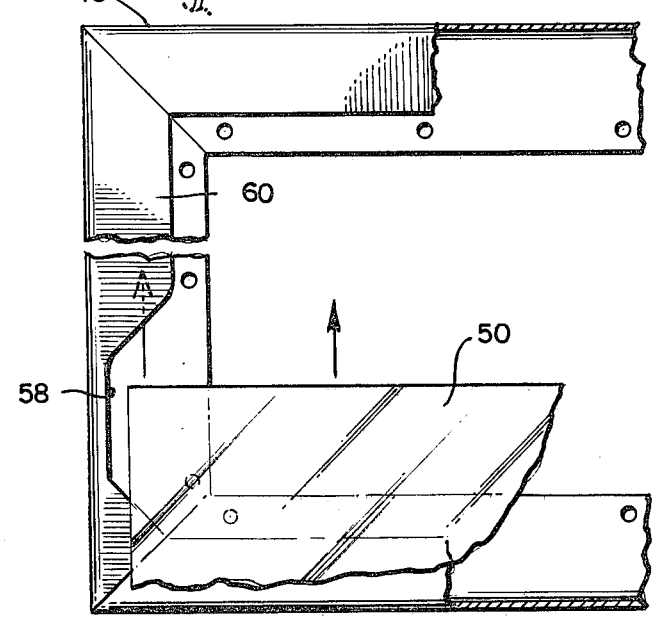
FIG. 6 is a front view partially broken away of one embodiment of the retaining flange for the drag reducing system of this invention.

The insertion and retention of overlay 50 can best be understood by referring to FIG. 6. Bezel 46, which peripherally surrounds the entire illuminated area, incorporates a flange portion 60 through almost the entire length thereof. Only near the bottom of bezel 46 on both sides thereof is a cut-away zone 58, where flange portion 60 is substantially non-existent. Overlay 50 is extended across the entire width of the illuminated area of wind deflector system 20, inserted in cut-away zone 58 and moved upwardly until the entire overlay 50 except for its bottom edges, is peripherally within flange portion 60 of bezel 46. Then, overlay 50 is allowed to descend slightly, now securely retained along the bottom edge by the bottom flange portion 60 of bezel 46 as well as on its three other peripheral edges. In order to achieve this easy entry and retention, the flange portion 60 along the top of bezel 46 has a greater width than the flange portion 60 along the bottom of bezel 46.

Figure 5:
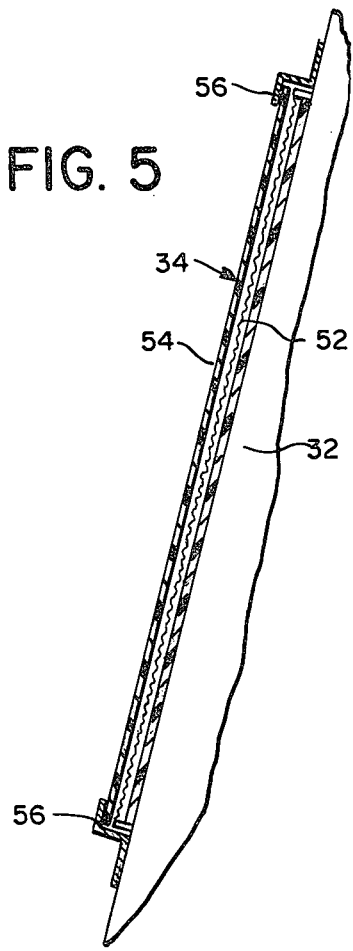
FIG. 5 is a partial cross-sectional side elevation view of the illuminated drag reducing system of FIG. 2.

By referring to FIG. 5, the construction of illuminated wind deflector system 30 can best be understood. Illuminated wind deflector system 30 comprises a wind deflecting panel 32 to which is secured an electroluminescent panel 52, a transparent indicia bearing flexible overlay 54, and a peripherally surrounding holding frame or track 56. The electroluminescent material 52 is connected to the power source of the truck in order to provide the desired illumination thereof.

As with overlay 50 of FIG. 3, flexible overlay 54 incorporates the desired advertising message printed thereon in the desired colors is then mounted within track 56 over the electroluminescent material 52 in order to provide the desired illumination thereof. As described above, the advertising/warning message is preferably added to the flexible overlay 54 on the reverse side thereof in order to prevent destruction thereof by weather or harmful road debris. However, if desired, overlay 54 can be printed on the front side and a protective panel, not shown, can be used to protect the indicia bearing overlay 54. An additional protective panel is particularly useful if a great expense was incurred in the preparation of advertising overlay 54. Furthermore, in the preferred embodiment, sealant material is spread peripherally around the entire frame or track 56 in order to prevent seepage of any moisture into the electroluminescent material.

As will be obvious to one skilled in the art, by employing either embodiment of the illuminated drag reducing system of this invention, a completely illuminated information message can be quickly and easily installed on the illuminated drag reducing system for constant, day and nighttime visibility and readability.

It will thus be seen that the objects set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A combined unitary, integrated drag reducing and illuminated information system for mounting to land transport vehicles, said vehicles having an upstanding substantially vertical drag producing surface, comprising in combination:
   (A) a drag reducing member for mounting on the vehicle and incorporating
      (a) a drag reducing surface
         (1) forming the frontal area of the drag reducing member,
         (2) extending transversely to the direction of motion of the vehicle,
         (3) spaced forward of said drag producing surface, and
         (4) generally sloping rearwardly from the mounting surface toward the upstanding drag producing surface for reducing the air drag of the vehicle when the vehicle is moving through a fluid,
      (b) a housing extending rearwardly from the drag reducing surface, and
      (c) a portal zone formed in the drag reducing surface and providing access to the housing through the frontal drag reducing surface;
   (B) a source of illumination mounted in said housing of said drag reducing member,
   (C) a light transmitting panel
      (a) dimensioned to fill the area defined by the portal zone, and
      (b) mounted to said drag reducing surface for completely closing and substantially sealing said portal zone, and
   (D) information indicia mounted to said light transmitting panel for illumination thereof by said source of illumination,
   whereby the combined, unitary, integrated system provides, simultaneously, continuous air drag reduction as the vehicle moves through a fluid and complete illumination of the information indicia for clear visibility.

2. The combined drag reducing and illuminated information system defined in claim 1, wherein said drag reducing panel is further defined as being mounted to the cab roof of a truck.

3. The combined drag reducing and illuminated information system defined in claim 1, wherein said source of illumination is mounted to said drag reducing member.

4. The combined drag reducing and illuminated information system defined in claim 3, when said source of illumination comprises electroluminescent material.

5. The combined drag reducing and illuminated information system defined in claim 1, wherein said information indicia is mounted substantially co-extensive with said exposed visible surface.

6. The combined drag reducing and illuminated information system defined in claim 1, wherein said source of illumination comprises at least one fluorescent light mounted within said housing and an inverter ballast for receiving low D.C. voltage and converting it to a level sufficient to operate said fluorescent lights.

7. The combined drag reducing and illuminated information system defined in claim 1, further comprising:
   (E) a light interrupt circuit connected to said source of illumination, producing intermittent, regulated illumination flashes when engaged.

8. A combined, unitary, integrated drag reducing and illuminated information system for mounting to land transport vehicles having an upstanding drag producing surface comprising, in combination:
   (A) a drag reducing panel for mounting on the cab roof of a land transport vehicle transverse to the direction of motion of the vehicle, spaced forward of said drag producing surface and sloping rearwardly from bottom to top for reducing the air drag of the vehicle when the vehicle is moving through a fluid, and incorporating
      (a) a housing extending rearwardly from the rear surface of said drag reducing panel; and
      (b) a portal zone providing access to said housing from the front surface of said drag reducing panel;
   (B) a source of illumination mounted in said housing;
   (C) a light diffusing panel
      (a) dimensioned to overlay the frontal entrance of the portal zone, and
      (b) removably mounted to said drag reducing panel at a plurality of securement locations peripherally surrounding the portal zone for completely closing and sealing said portal zone; and
   (D) information indicia removably mountable to said light diffusing panel for illumination thereof by said source of illumination,
   whereby the unitary, integrated, dual purpose system assures simultaneous air drag reduction on a continuous basis as the vehicle moves through a fluid while also providing complete illumination of the information indicia for clear visibility both day and night.

9. The combined drag reducing and illuminated information system defined in claim 8, further comprising a gasket peripherally surrounding the entire portal zone, securely retained in this position between said light diffusing panel and said drag reducing panel.

10. The combined drag reducing and illuminated information system defined in claim 8, wherein said housing and said drag reducing panel comprises an integrally molded unitary product.

11. The combined drag reducing and illuminated information system defined in claim 8, wherein said information indicia is mounted on a flexible sheet of transparent material.

12. A combined drag reducing and illuminated information system for mounting to land transport vehicles comprising, in combination:
   (A) a drag reducing panel for mounting on the cab roof of a land transport vehicle transverse to the direction of motion of the vehicle and sloping rearwardly from bottom to top for reducing the air drag of the vehicle when the vehicle is moving through a fluid, and incorporating
      (a) a housing extending rearwardly from the rear surface of said drag reducing panel; and
      (b) a portal zone providing access to said housing from the front surface of said drag reducing panel;

(B) a source of illumination mounted in said housing;
(C) a light diffusing panel removably mounted to said drag reducing panel for completely closing said portal zone;
(D) information indicia mounted on a flexible sheet of transparent material and removably mountable to said light diffusing panel for illumination thereof by said source of illumination; and
(E) a bezel mounted to said light diffusing panel and incorporating a flange area for secure retention of said indicia flexible sheet.

13. A combined drag reducing and illuminated advertising system defined in claim 12, wherein said bezel comprises a sheet material insertion zone for easy entry and withdrawal of said sheet material.

14. A combined drag reducing and illuminated information system for mounting to land transport vehicles comprising, in combination:
(A) a drag reducing panel for mounting on the cab roof of a land transport vehicle transverse to the direction of motion of the vehicle for reducing the air drag of the vehicle when the vehicle is moving through a fluid and incorporating
   (a) a housing extending rearwardly from the rear surface of said drag reducing panel, and
   (b) a portal zone providing access to said housing from the front surface of said drag reducing panel;
(B) a source of illumination mounted in said housing;
(C) a light diffusing panel removably mounted to said drag reducing panel for completely closing said portal zone;
(D) information indicia mounted on a flexible sheet of transparent material and removably mountable to said light diffusing panel for illumination thereof by said source of illumination;
(E) a bezel mounted to said light diffusing panel and incorporating
   (a) a substantially peripherally surrounding flange area for secure retention therein of said indicia bearing flexible sheet, and
   (b) a portion of the flange area having a reduced width, thereby forming an insertion zone for easy entry and withdrawal of said flexible sheet material without removal and replacement of said bezel.

15. The combined drag reducing and illuminated information system defined in claim 14, wherein said bezel is further defined as comprising
   (c) a horizontal dimension slightly greater than the length of said indicia bearing flexible sheet, and
   (d) a vertical dimension slightly greater than the sum of the width of said indicia bearing flexible sheet and the width of said flange area adjacent said insertion zone, thereby assuring easy insertion of the entire indicia bearing flexible sheet and secure retention thereof.

16. In a land transport vehicle having a substantially vertical drag producing surface and a substantially horizontal mounting surface spaced forward of said vertical drag producing surface in a plane wherein said vertical drag producing surface extends above the plane of said horizontal surface, a dual-purpose, unitary, integral system for simultaneously reducing air drag and illuminating information comprising:
(A) a drag reducing member mounted on said horizontal surface and incorporating
   (a) a drag reducing surface
      (1) forming the frontal area of the drag reducing member,
      (2) spaced forward of said drag producing surface, and
      (3) angularly sloping rearwardly relative to said vertical drag producing surface for reducing the drag of said vertical surface when the vehicle is moving through a fluid;
   (b) a housing extending rearwardly from the drag reducing surface
   (c) a portal zone formed in the drag reducing surface and providing access to the housing through the frontal drag reducing surface
(B) information and indicia
   (a) mounted to said drag reducing surface, and
   (b) dimensioned to overlay and substantially fill the area defined by the portal zone; and
(C) illumination means mounted in the housing of the drag reducing member behind the information indicia for complete illumination of the information indicia when required,
whereby the unitary integral system provides simultaneously both drag reduction and complete illumination of the entire information indicia.

* * * * *